(12) United States Patent
Huang

(10) Patent No.: US 8,422,842 B2
(45) Date of Patent: Apr. 16, 2013

(54) PLASTIC FIBER COUPLER AND METHOD OF MANUFACTURING THEREOF

(76) Inventor: Yong Huang, Milpitas, CA (US)

( * ) Notice: Subject to any disclaimer, the term of this patent is extended or adjusted under 35 U.S.C. 154(b) by 345 days.

(21) Appl. No.: 12/807,323

(22) Filed: Sep. 2, 2010

(65) Prior Publication Data

US 2012/0057823 A1 Mar. 8, 2012

(51) Int. Cl.
*G02B 6/26* (2006.01)

(52) U.S. Cl.
USPC ............... 385/51; 385/15; 385/123; 385/127; 385/128; 385/141

(58) Field of Classification Search .................... 385/15, 385/51, 123, 127, 128, 141
See application file for complete search history.

(56) References Cited

U.S. PATENT DOCUMENTS

| | | | |
|---|---|---|---|
| 5,473,716 A * | 12/1995 | Lebby et al. | 385/54 |
| 7,660,502 B1 * | 2/2010 | Stone | 385/115 |
| 7,881,569 B2 * | 2/2011 | Zhang et al. | 385/26 |

* cited by examiner

*Primary Examiner* — Jennifer Doan

(57) ABSTRACT

Embodiments of the present invention provide a plastic fiber coupler. The plastic fiber coupler includes a bundle of plastic optical fibers (POFs) arranged in a ring-shape; and an optical mixing tube attached to a cross-section of the bundle of POFs. In one embodiment, a cross-section of the optical mixing tube may be coated with a reflective film forming a reflective type plastic fiber coupler; in another embodiment, the optical mixing tube is attached to a second bundle of plastic optical fibers forming a transmissive type plastic fiber coupler.

20 Claims, 11 Drawing Sheets

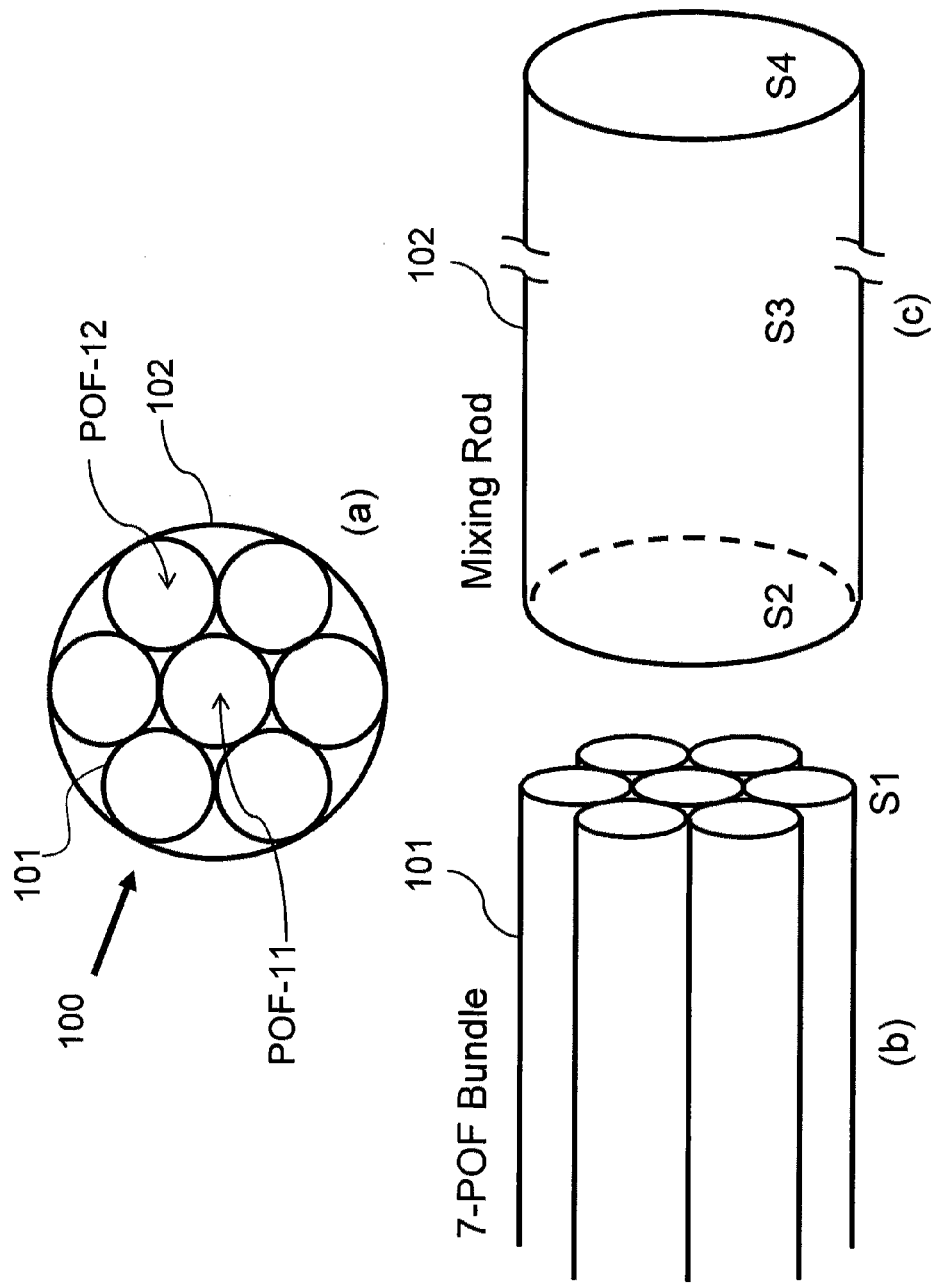
Fig.1 7-POF Plastic Fiber Coupler (Prior Art)

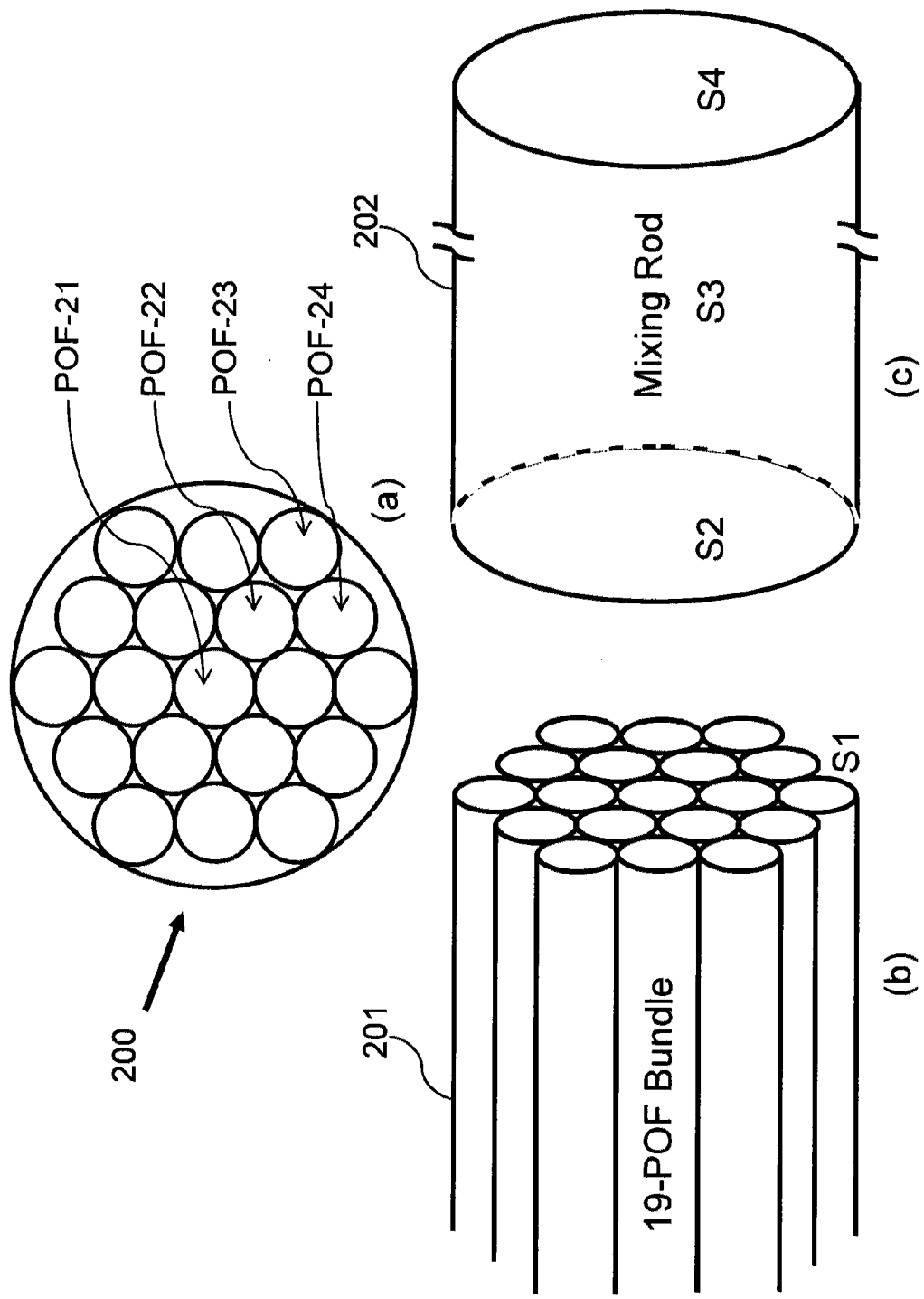
Fig.2 19-POF Plastic Fiber Coupler (Prior Art)

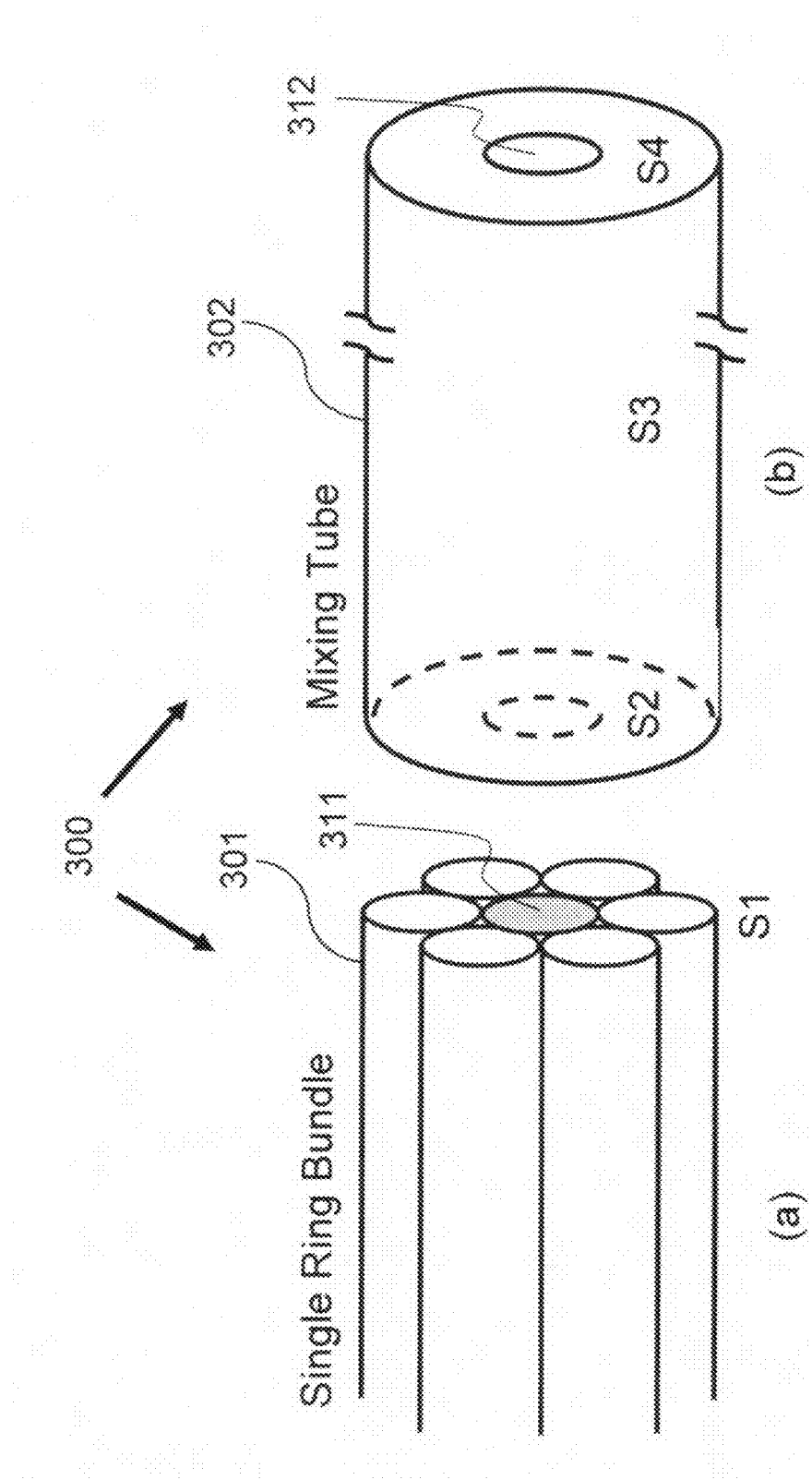
Fig.3 6-POF Plastic Fiber Coupler

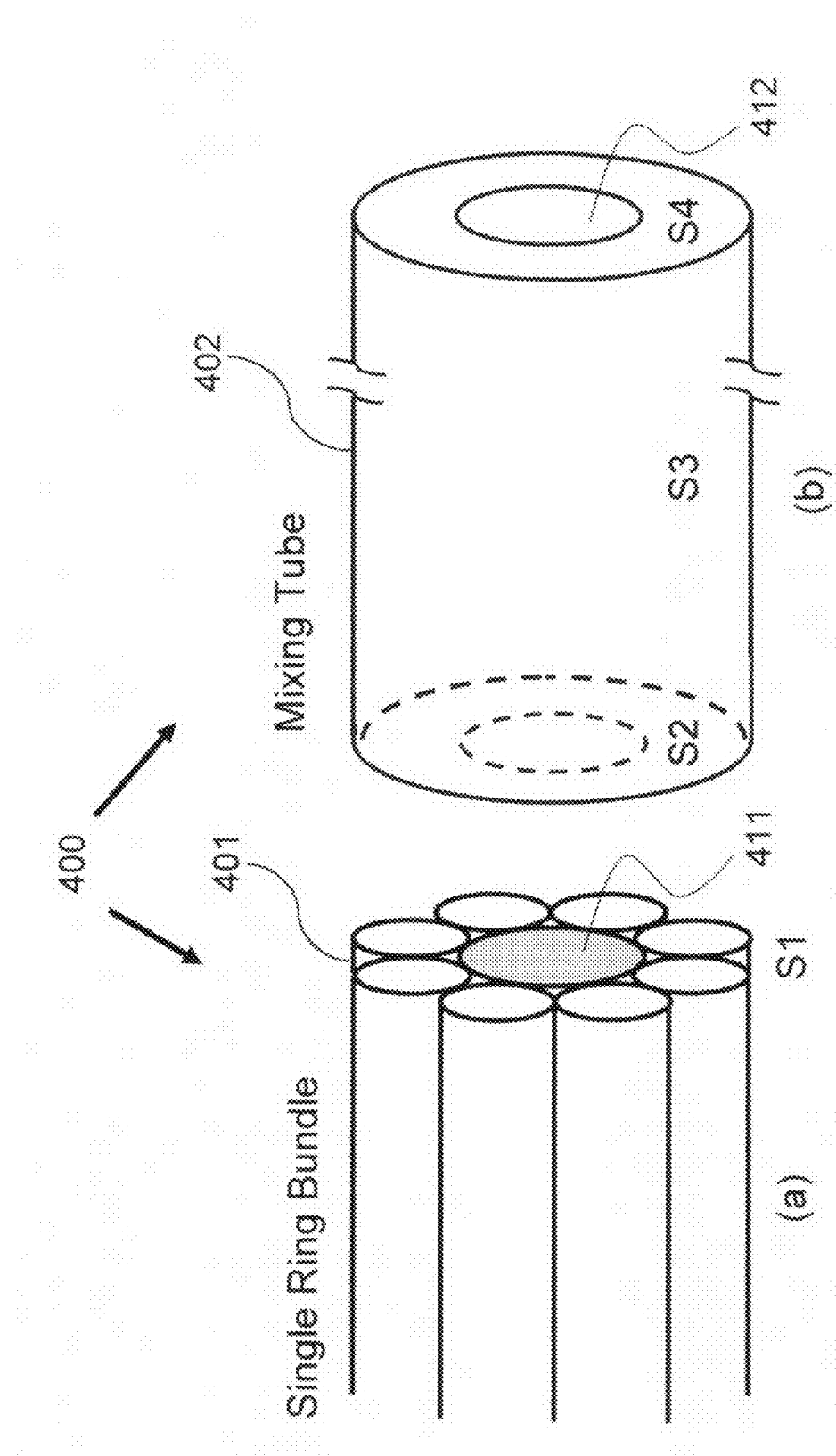
Fig. 4 8-POF Plastic Fiber Coupler

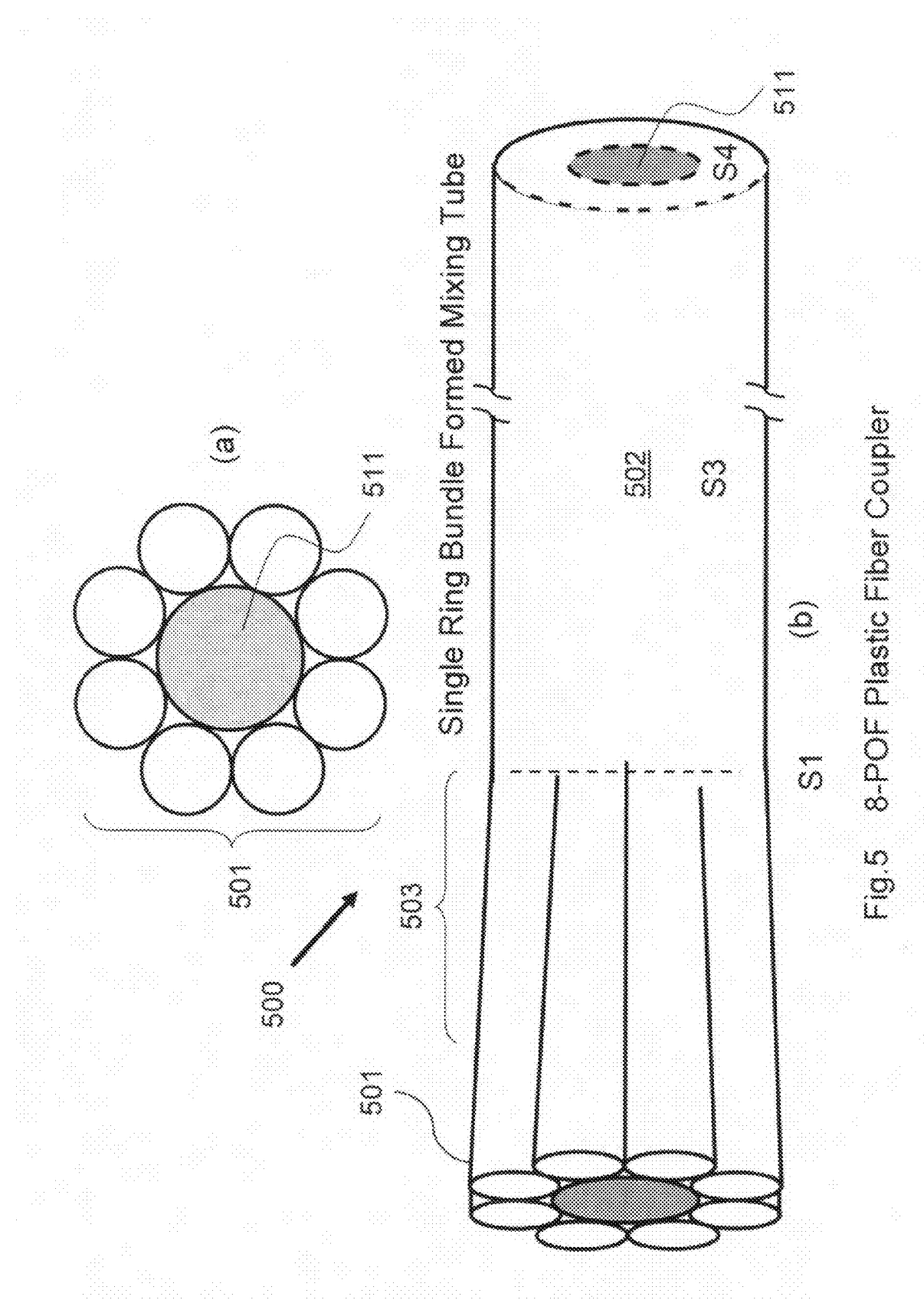
Fig.5 8-POF Plastic Fiber Coupler

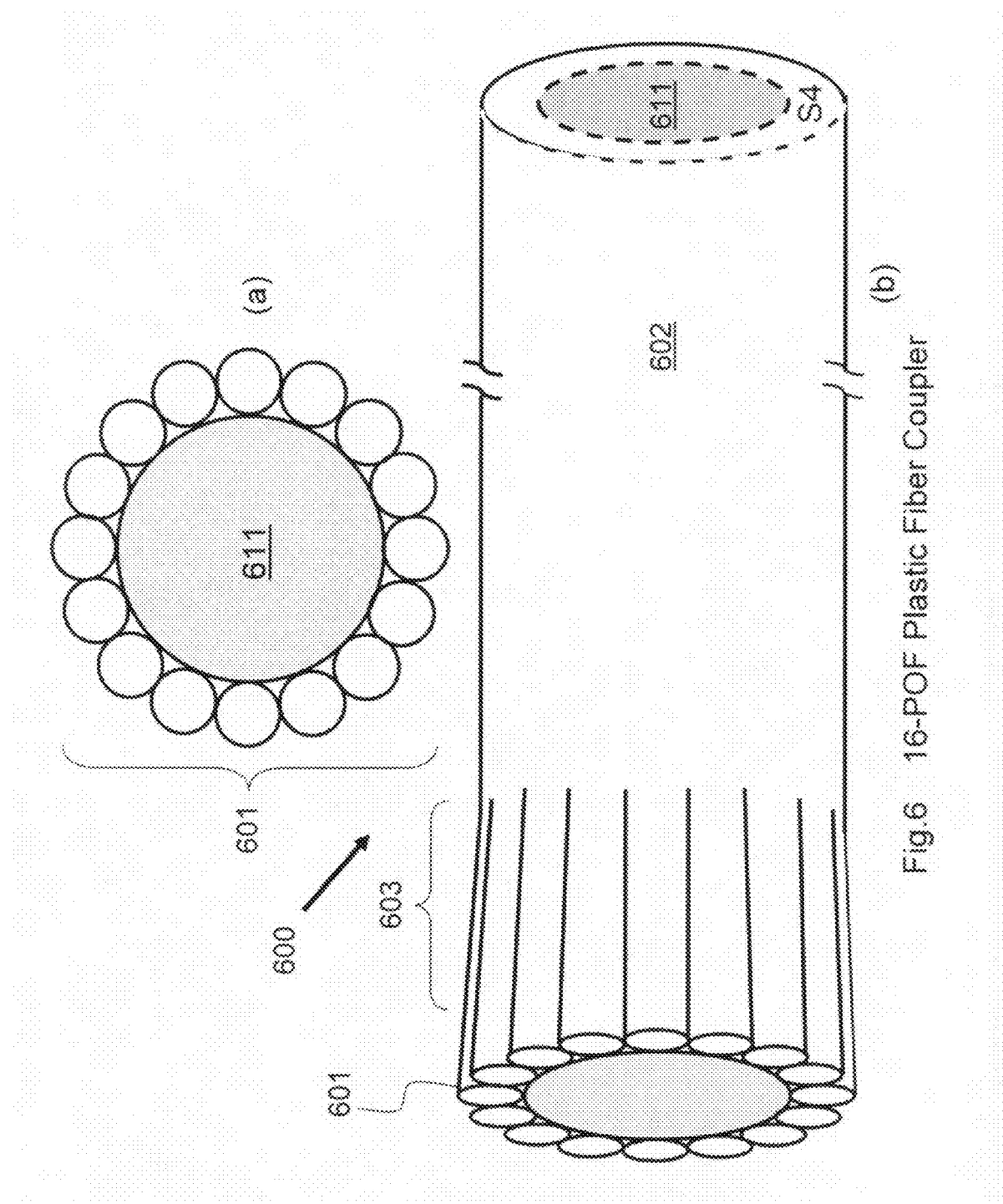
Fig.6 16-POF Plastic Fiber Coupler

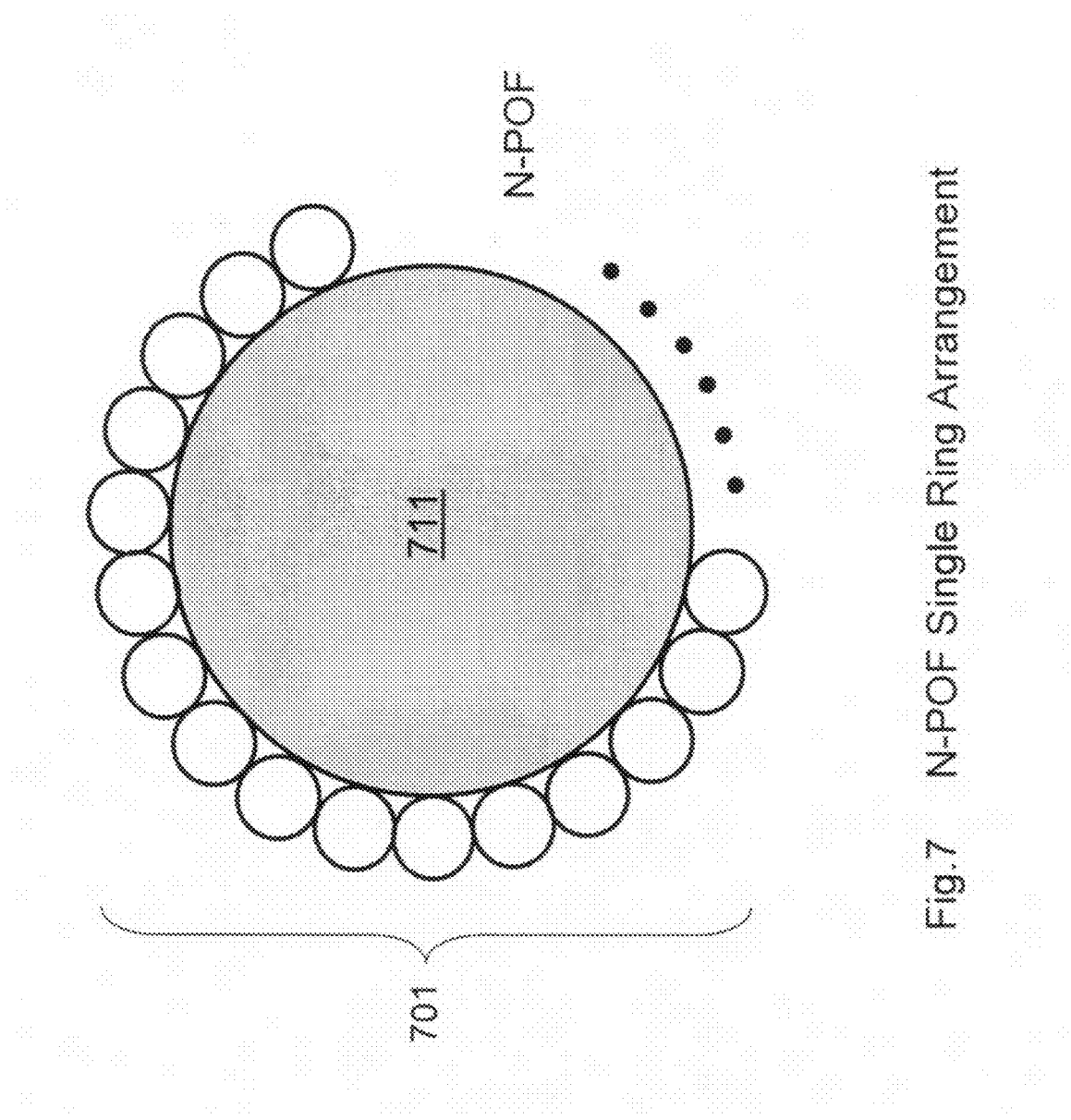
Fig. 7  N-POF Single Ring Arrangement

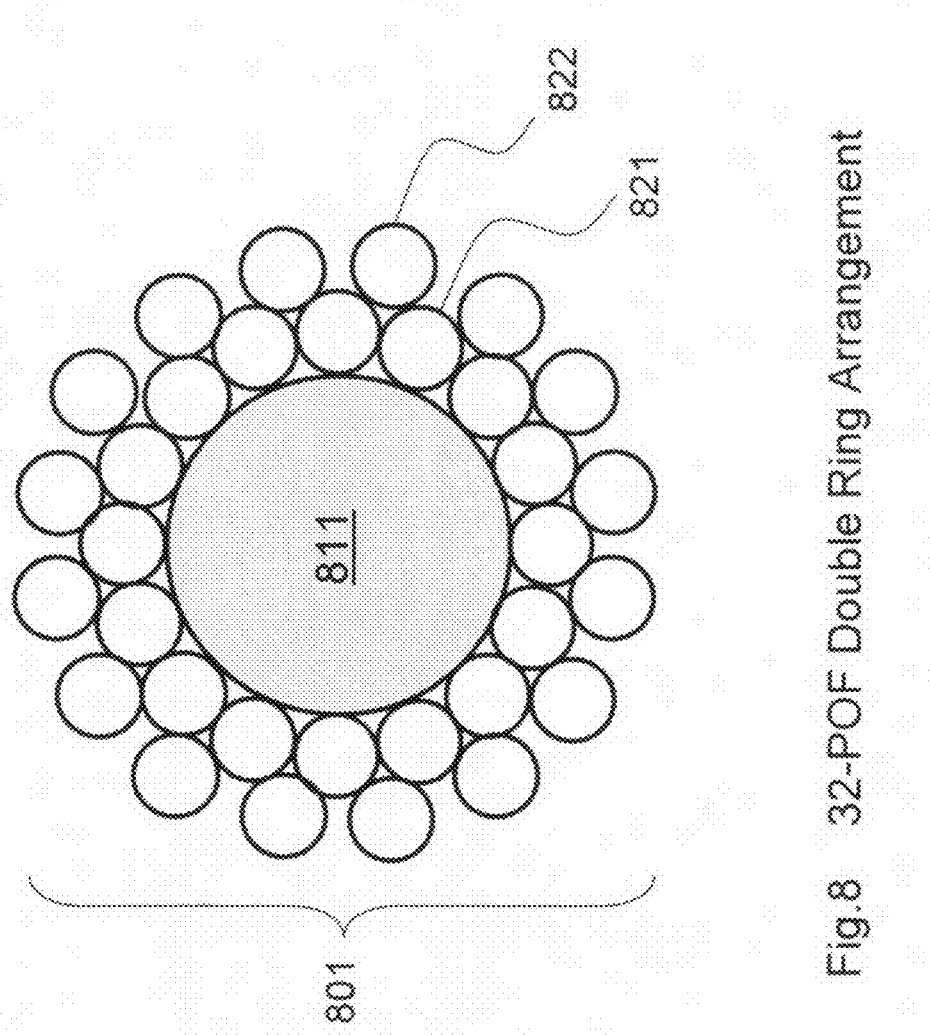
Fig.8  32-POF Double Ring Arrangement

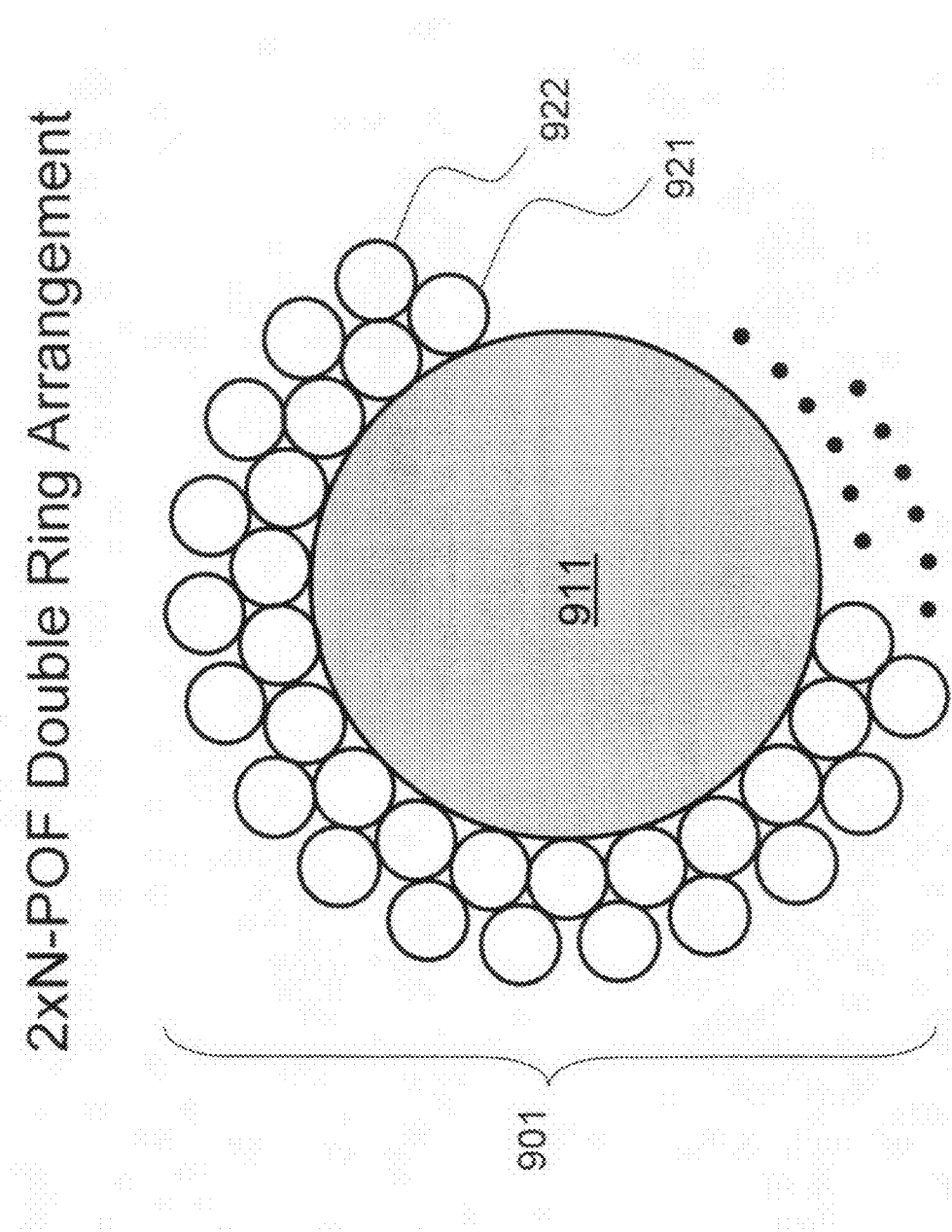
Fig. 9  2xN-POF Double Ring Arrangement

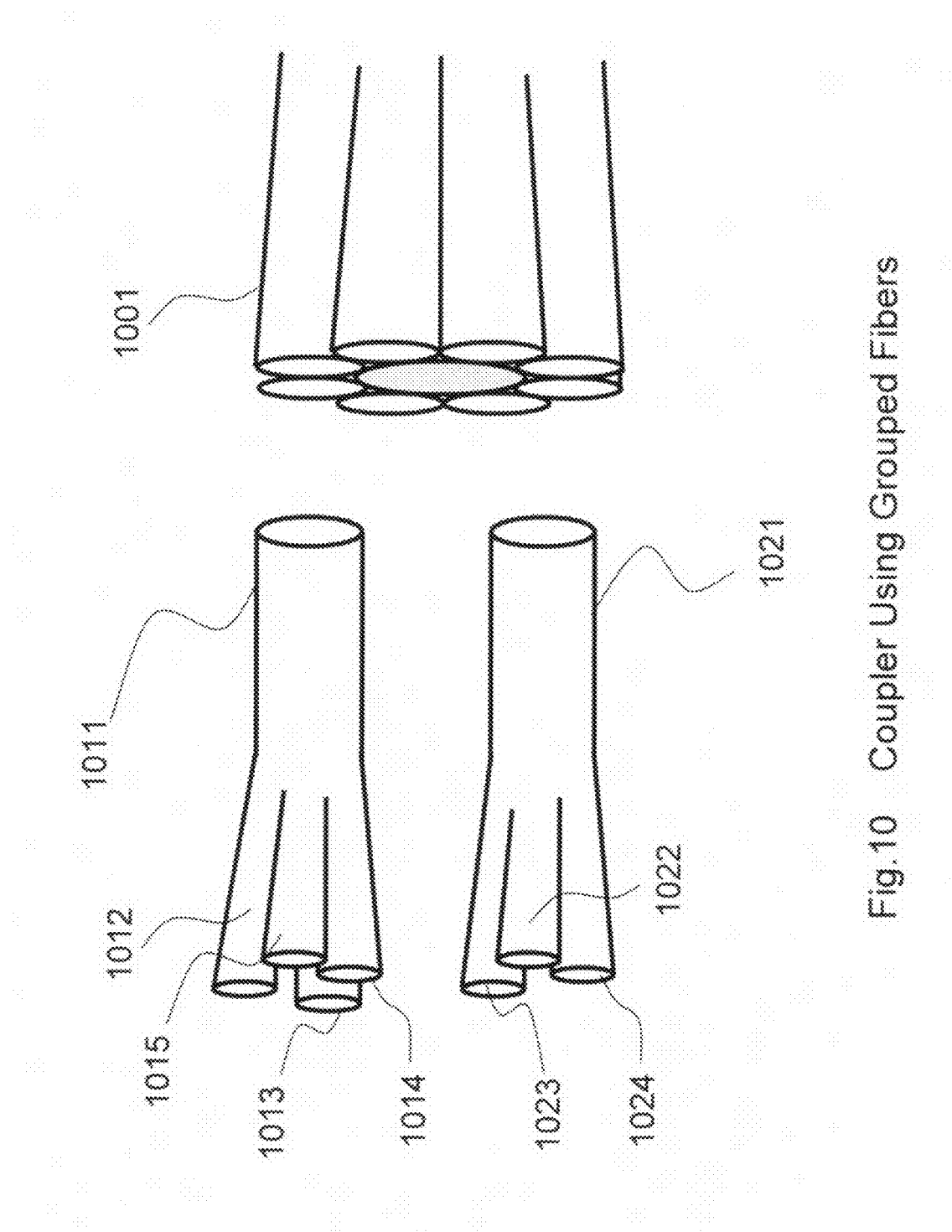
Fig.10 Coupler Using Grouped Fibers

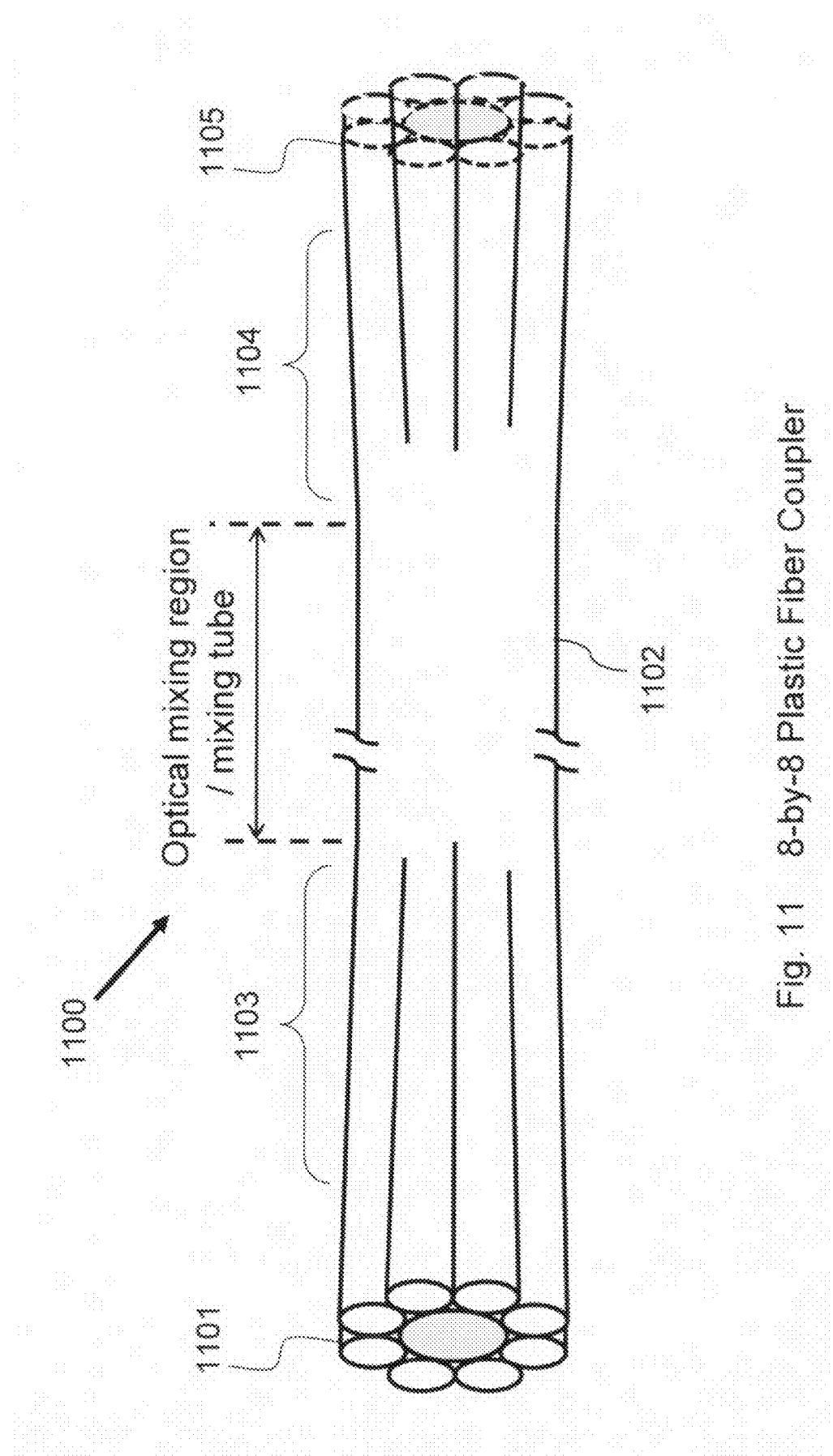
Fig. 11 8-by-8 Plastic Fiber Coupler

US 8,422,842 B2

PLASTIC FIBER COUPLER AND METHOD OF MANUFACTURING THEREOF

FIELD OF THE INVENTION

The present invention relates generally to optical fiber couplers and in particular relates to structures of plastic optical fiber couplers and method of manufacturing thereof.

BACKGROUND OF THE INVENTION

With continued improvement and maturing in technology, various plastic optical fibers have been manufactured and/or produced. These plastic optical fibers (POFs) have been making their headways into system application in a variety of fields such as, for example, home theaters, automobiles, and aerospace industry. In the meantime, there has been an increasing demand for optical fiber couplers, in particular plastic optical fiber couplers (or plastic fiber couplers in short) that are considered to be one of the several key components or devices that will enable essential configurations of systems that utilize plastic optical fibers.

The manufacturing of plastic fiber couplers (PFCs) started about ten (10) years ago, but so far little practical progress has been made. This is because, at least partially, that fused biconical taper technology, which was developed specifically for silica fibers, is not readily suitable for and therefore can not be directly applied to plastic optical fibers in making plastic fiber couplers. Even though there may have been scientific reports, from universities and research institutes alike, on some plastic fiber couplers, most of these reports focus mainly on couplers that have low number of input and/or output ports. Without any suitable replacement for the fused biconical taper technology, it has been very difficult to manufacture plastic fiber couplers, in particular those with high number of input and/or output ports.

For example, among some of the reported plastic fiber couplers there is a seven (7) port reflective type plastic fiber coupler as being demonstratively illustrated in FIG. 1(a)-FIG. 1(c). Hereinafter, FIG. 1(a)-FIG. 1(c) may be collectively referred to as FIG. 1 and similar ways of referencing may be used for other figures as well. This seven (7) port reflective type plastic fiber coupler is based upon a mixing rod technology. More specifically, FIG. 1(a) demonstratively illustrates an overlapping view of cross-sections of a fiber bundle 101 and a mixing rod 102 of a plastic fiber coupler 100. Fiber bundle 101 is composed of seven plastic optical fibers (POF-11, POF-12, etc.), used as input and/or output ports of plastic fiber coupler 100. The seven POFs may be arranged or stacked together in a way that one POF (e.g., POF-11) is positioned or situated in the center of fiber bundle 101 and surrounded by six (6) other POFs, including POF-12, of same or similar size.

FIG. 1(b) is a demonstrative perspective view of fiber bundle 101 shown in FIG. 1(a). The seven POFs of fiber bundle 101 may have a common cross-sectional area S1. During the process of manufacturing plastic fiber coupler 100, cross-sectional area S1 may be prepared to have a flat and smooth surface and then be attached or glued to a cross-section of mixing rod 102 as being further described below.

FIG. 1(c) is a demonstrative perspective view of mixing rod 102 used in making plastic fiber coupler 100. Mixing rod 102 may be another piece of POF having a diameter around 3 mm; a length ranging from around 3 cm to around 20 cm; a cladding layer S3; and first and second cross-sectional areas S2 and S4. In making reflective plastic fiber coupler 100, cross-sectional area S2 of mixing rod 102 may be prepared to have a flat and smooth surface, and then be glued or attached to cross-sectional area S1 of fiber bundle 101. At the other end of mixing rod 102, cross-sectional area S4 may be applied with a reflective coating or film to act like a mirror to light incident thereupon. Thereby, for example, when there is a light from any one of the seven POFs (e.g., POF-11, or POF-12) being launched into mixing rod 102, the light may be reflected back into all of the seven POFs, effectively creating optical coupling effect among the seven POFs.

However, the seven-port reflective type plastic fiber coupler 100 normally has a large insertion loss. Even though optical light may be fully, close to 100%, coupled from one of the seven POFs into mixing rod 102, when the light is reflected back by cross-sectional area S4 of mixing rod 102 and coupled into the seven POFs, because of mismatch in cross-sectional areas, in particular with cross-sectional area S2 of mixing rod 102 being larger than cross-sectional area S1 which is a sum of the total seven POFs, a portion of the light or optical energy may inevitably get launched into areas/spaces outside the seven POFs and lost.

In addition to large insertion loss, optical light may not get uniformly coupled back into the seven POFs. This is because, for example as shown in FIG. 1(a), POF-11 and POF-12 may be at different locations of cross-sectional area S1, relative to the center thereof. Since optical light concentrates more around the center area of mixing rod 102 than around the edge areas, more light are likely to be coupled back into POF-11 in the center than into POF-12 at the edge of fiber bundle 101. It is generally understood that with the increase of number of ports, such insertion loss and uniformity issue as being discussed above may further degrade or become worse.

FIG. 2(a)-2(c) are demonstrative illustrations of another reflective type plastic fiber coupler 200 made of a bundle of nineteen (19) plastic optical fibers and a mixing rod as is known in the art. In particular, when the nineteen POFs of fiber bundle 201 are stacked in a 3-4-5-4-3 layered fashion as shown in FIG. 2(a), plastic optical fibers such as POF-21, POF-22, POF-23, and POF-24 may be situated or positioned at different locations across cross-sectional area S1 of fiber bundle 201 (thus cross-sectional area S2 of mixing rod 202 which is glued to S1) relative to the center thereof. Uniformity of optical light, that is reflected back from cross-sectional area S4 of mixing rod 202, guided by a cladding S3, and coupled into the nineteen input/output POFs, is expected to become worse than that in the seven-port plastic fiber coupler 100. It is known that increasing the length of mixing rod 202 will generally not help improving the uniformity of optical light being coupled into the input/output POFs.

SUMMARY OF EMBODIMENTS OF THE INVENTION

Embodiments of the present invention provide an optical fiber coupler. The optical fiber coupler includes a bundle of plastic optical fibers (POFs) arranged in a ring-shape; and an optical mixing tube attached to a cross-section of the bundle of POFs.

In one embodiment, the bundle of POFs includes a single layer of the POFs forming a single ring-shape and wherein thickness of a sidewall of the optical mixing tube is substantially same as a diameter of the POFs. In a further embodiment, the optical mixing tube has first and second cross-sections of the sidewall, with the first cross-section being glued to the cross-section of the bundle of POFs and the second cross-section being coated with a reflective film or being attached to a reflective mirror. In yet a further embodiment, the optical mixing tube has a length ranging from about 5 cm to about 20 cm.

In another embodiment, the bundle of POFs includes a supporting rod providing support for forming the ring-shape bundle of POFs in a center thereof. In a further embodiment, diameter of the supporting rod is determined by the number of the POFs surrounding the supporting rod such that the POFs forms a tightly arranged single ring in contact with each other and with the supporting rod.

In yet another embodiment, the bundle of POFs includes two layers of the POFs forming a double ring-shape, and wherein thickness of a sidewall of the optical mixing tube is larger than a diameter of the POFs but smaller than two times the diameter.

According to one embodiment, the bundle of POFs is a bundle of input POFs and the optical fiber coupler further includes a bundle of output POFs arranged in a ring-shape, wherein the optical mixing tube is attached to the bundle of input POFs at a first cross-section and attached to the bundle of output POFs at a second cross-section. In one instance, the optical mixing tube has a length between the first and the second cross-sections ranging from about 10 cm to about 40 cm.

Embodiments of the present invention provides another fiber coupler, which includes a bundle of input plastic optical fibers (POFs) arranged in a single ring-shape; a bundle of output POFs arranged in a single ring-shape; and an optical mixing tube connecting a cross-section of the bundle of input POFs to a cross-section of the bundle of output POFs.

In one embodiment, the optical mixing tube has a length ranging from about 10 cm to about 40 cm. In another embodiment, the optical mixing tube is made of a same material as that of the POFs or a substantially pure silica tube. In yet another embodiment, the inner and outer surfaces of a sidewall of the optical mixing tube are coated with a layer of polymer material, the layer of polymer having substantially same optical properties as that of a cladding layer of the POFs.

Embodiments of the present invention provides yet another fiber coupler which includes a bundle of plastic optical fibers (POFs) arranged in a ring-shape; a supporting rod surrounded by the bundle of POFs; and an optical mixing tube transformed from a portion of the bundle of POFs.

In one embodiment, the ring-shape bundle of POFs transforms gradually into the optical mixing tube through a short transitional region. In another embodiment, claddings of the portion of the bundle of POFs are removed before a heating process is applied to deform the bundle of POFs into the optical mixing tube. Thickness of a sidewall of the optical mixing tube, in one instance, is about same or slightly less than a diameter of the POFs after claddings of the POFs are removed.

In another embodiment, the optical mixing tube has a length between about 5 cm and about 20 cm, and a cross-section at an end of the optical mixing tube is coated with a reflective film or being attached to a reflective mirror.

In yet another embodiment, the supporting rod is made of a plastic optical fiber having a diameter larger than a diameter of the POFs and having a cladding made of substantially same material as claddings of the POFs. The optical mixing tube is formed, in one instance, on top of the supporting rod, having an inner surface made of the cladding of the supporting rod.

BRIEF DESCRIPTION OF THE DRAWINGS

The present invention will be understood and appreciated more fully from the following detailed description of embodiments of the invention, taken in conjunction with accompanying drawings of which:

FIG. 1(a), FIG. 1(b), and FIG. 1(c) are demonstrative illustrations of a reflective type plastic fiber coupler made of a bundle of seven (7) plastic optical fibers as is known in the art;

FIG. 2(a), FIG. 2(b), and FIG. 2(c) are demonstrative illustrations of a reflective type plastic fiber coupler made of a bundle of nineteen (19) plastic optical fibers as is known in the art;

FIG. 3(a) and FIG. 3(b) are demonstrative illustrations of a reflective type plastic fiber coupler made of a single ring bundle of six (6) plastic optical fibers and a mixing tube according to one embodiment of the present invention;

FIG. 4(a) and FIG. 4(b) are demonstrative illustrations of a reflective type plastic fiber coupler made of a single ring bundle of eight (8) plastic optical fibers and a mixing tube according to one embodiment of the present invention;

FIG. 5(a) and FIG. 5(b) are demonstrative illustrations of a reflective type plastic fiber coupler made of a single ring bundle of eight (8) plastic optical fibers and a mixing tube according to another embodiment of the present invention;

FIG. 6(a) and FIG. 6(b) are demonstrative illustrations of a reflective type plastic fiber coupler made of a single ring bundle of sixteen (16) plastic optical fibers and a mixing tube according to one embodiment of the present invention;

FIG. 7 is a demonstrative illustration of cross-section of N plastic optical fibers being arranged in a single ring according to one embodiment of the present invention;

FIG. 8 is a demonstrative illustration of cross-section of thirty-two (32) plastic optical fibers being arranged in a double ring according to one embodiment of the present invention;

FIG. 9 is a demonstrative illustration of cross-section of 2×N plastic optical fibers being arranged in a double ring according to one embodiment of the present invention;

FIG. 10 is a demonstrative illustration of small groups of fibers being used in plastic fiber coupler according to one embodiment of the present invention; and FIG. 11 is a demonstrative illustration of an eight-by-eight transmissive type fiber coupler according to one embodiment of the present invention.

It will be appreciated that for the purpose of simplicity and clarity of illustration, elements in the drawings have not necessarily been drawn to scale. For example, dimensions of some of the elements may be exaggerated relative to other elements for clarity purpose.

DETAILED DESCRIPTION OF EMBODIMENTS OF THE PRESENT INVENTION

FIG. 3(a) and FIG. 3(b) are demonstrative illustrations of a reflective type plastic fiber coupler 300 made of a single ring bundle of six (6) plastic optical fibers and a mixing tube according to one embodiment of the present invention. More specifically, FIG. 3(a) is a perspective view of a single ring bundle 301 of six (6) plastic optical fibers. At the center of fiber bundle 301 there exists a supporting rod 311 which may be, for example, another plastic optical fiber but embodiments of the present invention are not limited in this respect and materials other than plastic optical fibers may be used in general. This is because supporting rod 311 is no longer used as an input and/or output port, and is used as a support for the formation of fiber bundle 301. In FIG. 3(a), cross-section of supporting rod 311 is illustrated in dark shade. Because of its unique star-shape structure, hereinafter, plastic fiber coupler 300, as well as those illustrated in below FIGS. 4-11, may also be referred to, from time to time, as star couplers.

Throughout below description of the present invention, plastic optical fibers may have been used, preferably, as examples in forming various plastic fiber couplers. However, essence and embodiment of the present invention are not limited in this respect. For example, other types of fibers including silica fibers may be used, in replacement of plastic optical fibers, in forming various optical fiber couplers in more or less similar manners as being described below.

There are standard POFs and non-standard POFs in the current market. A standard POF normally has a diameter of about 1 mm, including a diameter of core around 0.98 mm and a cladding layer of around 0.01 mm in thickness. Non-standard POFs may include POFs of different diameters and in some case a diameter as big as, for example, 3 mm. According to embodiment of the present invention, both standard and non-standard POFs may be used in making plastic fiber coupler 300.

According to one embodiment of the present invention, in making plastic fiber coupler 300, a mixing tube 302 with a center hole 312 of approximately the same diameter as that of supporting rod 311 may be provided. As is shown in FIG. 3(b), a smooth cross-sectional area S2 of mixing tube 302 may be carefully prepared and then attached, for example glued, to a cross-sectional area S1 of fiber bundle 301 of single ring shape, as shown in FIG. 3(a), such that the six POFs surrounding supporting rod 311 may be symmetrically placed/situated along cross-section of sidewall S3 of mixing tube 302.

It is to be noted that fiber bundle 301 and mixing tube 302 are shown in FIG. 3(a) and FIG. 3(b) as two separate entities solely for the purpose of illustration and are in fact attached or glued together, as being described above, as a single plastic fiber coupler 300. At the other end of mixing tube 302, a reflective coating, a film, or a mirror may be applied to cross-sectional area S4 of mixing tube 302. The reflective coating serves to reflect lights back along sidewall S3 of mixing tube 302 into the six POFs of fiber bundle 301. Because of better matched cross-sectional areas S1 and S2 (in particular with large number of fibers), relatively low insertion loss of plastic fiber coupler 300 may be achieved.

As a measure to further reduce insertion loss of plastic fiber coupler 300, according to one embodiment of the present invention, a polymer layer may be coated onto both the inner and outer surfaces of sidewall S3 of mixing tube 302. For example, the application of a polymer layer to the sidewall S3 of mixing tube 302 may make mixing tube 302 have approximately the same numerical aperture as that of the POFs of fiber bundle 301. In one instance, mixing tube 302 may be made of reasonably pure silica (in order to reduce loss) or some specially made plastic optical fiber using materials such as PMMA, although the latter may be more expensive.

When there is an optical input from one of the six POFs, optical light may be coupled from the POF into mixing tube 302. During propagation along mixing tube 302, the optical light may expand laterally while travelling, and may subsequently be reflected back at cross-sectional area S4 of mixing tube 302. When mixing tube 302 has a sufficient length wherein optical light travels twice, one forward and one backward, a uniform distribution of the optical light or energy may eventually be achieved at cross-sectional area S2 of mixing tube 302 to incident upon cross-sectional area S1 of the bundle of plastic optical fibers 301. As a result, optical light may be close to equally coupled back into the six plastic optical fibers of fiber bundle 301.

As being described above and demonstratively illustrated in FIG. 3(a) and FIG. 3(b), embodiment of the present invention provides a relatively easy way or method of making optical fiber couplers with high number count of input/output ports. For example, an eight-port, sixteen-port, thirty-two-port, or even forty-eight-port optical fiber coupler may be made by simply adopting a mixing tube with a bigger inner diameter, but with a thickness of sidewall that usually equals to, or is about the same as, the diameter of the input/output plastic optical fibers used in the fiber bundle, and by adopting a fiber bundle arranged around a supporting rod having a diameter that is substantially equal to the inner diameter of the mixing tube. In some embodiments, thickness of sidewall of the mixing tube may be bigger than the diameter of the input/output plastic optical fibers if double-ring, or multiple-ring shape of fiber bundles are used, as being described below in more details with reference to FIG. 8 and FIG. 9. Additionally, a person skilled in the art will appreciate that the supporting rod is used for the ease of forming the fiber bundle, and the supporting rod is not essential to the functionality of the optical fiber coupler. In other words, a fiber bundle may be formed by using other existing techniques or any future developed techniques without the use of the supporting rod, or the supporting rod may be removed after the fiber bundle is formed.

FIG. 4(a) and FIG. 4(b) are demonstrative illustrations of a reflective type plastic fiber coupler 400 made of a single ring bundle of eight (8) plastic optical fibers and a mixing tube according to another embodiment of the present invention. More specifically, FIG. 4(a) illustrates a fiber bundle 401 of single-ring shape having a center supporting rod 411 whose cross-sectional area is shaded to be distinguished from cross-sectional areas S1 of the eight (8) plastic optical fibers surrounding the supporting rod 411. Supporting rod 411 may be preferably made of plastic material of same or similar thermal properties as those of the surrounding POFs although other suitable materials may be used as well. With cross-sectional area S2 of mixing tube 402 being properly prepared, cross-section S1 of fiber bundle 401 and cross-section S2 of mixing tube 402 may be glued together to form a star-type plastic fiber coupler. Cross-section S4 of mixing rod 402 is applied with a reflective coating or film or is attached to a mirror to increase reflectivity to light incident thereupon. Both inner and outer surfaces of sidewall S3 of mixing tube 402 may be coated with a layer of polymer as well to reduce the overall insertion loss of the reflective star coupler or reflective type plastic fiber coupler 400. Because glue is used in connecting fiber bundle 401 with mixing tube 402, high quality of glue and good workmanship of making fiber connection are essential in achieving long-term reliability of the plastic fiber coupler that may otherwise be affected by the thermal characteristics of materials.

FIG. 5(a) and FIG. 5(b) are demonstrative illustrations of a reflective type plastic fiber coupler 500 made of a single ring bundle of eight (8) plastic optical fibers and a mixing tube according to another embodiment of the present invention. More specifically, FIG. 5(a) illustrates a cross-sectional view of a single ring fiber bundle 501 of, for example, eight (8) plastic optical fibers with a supporting rod 511 in the center, whose cross-sectional area is shown in shade, and FIG. 5(b) illustrates a perspective view of plastic fiber coupler 500.

According to one embodiment of the present invention, in order to further reduce insertion loss and improve reliability, mixing tube 502, as shown in FIG. 5(b), may be made in part of the eight plastic optical fibers through a heating process. More specifically, cladding layer of portion of the eight plastic optical fibers 501 may be first removed. The exposed plastic optical fibers may then be softened through a carefully controlled heating process and partially melted together in a short transitional region 503, under proper temperature, to form a single mixing tube region 502 surrounding supporting tube 511.

The length of mixing tube 502 may be determined, taking into account that optical light travels twice inside mixing tube 502 in a reflective type fiber coupler, such that uniformity of optical intensity is obtained at cross-section S1 where optical light is coupled back into plastic optical fibers 501. For example, the length of mixing tube 502 normally ranges from 5 to 20 cm, and generally increases with the number of ports or input/output fibers used increases. At the other cross-sectional area S4 of mixing tube 502, a reflective coating or film or mirror may be applied in order to increase the reflectivity of cross-sectional area S4 of mixing tube 502 to optical light incident thereupon. In addition, when the supporting rod 511 is made of another plastic optical fiber and therefore has a cladding layer, this cladding layer becomes the inner surface of sidewall of mixing tube 502 and thereby may prevent light from escaping into the supporting rod. In one embodiment, a new cladding layer may be applied to the outer surface of sidewall S3 to prevent light from escaping into areas outside of mixing tube 502, in an effort to further reduce insertion loss of plastic fiber coupler 500.

Plastic fiber coupler 500 shown in FIG. 5(a) and FIG. 5(b) has a mixing tube 502 being transformed from a portion of fiber bundle 501 and therefore mixing tube 502 forms a single unity with fiber bundle 501 inside plastic fiber coupler 500. This approach avoids the use of any glue in connecting the mixing tube with the fiber bundle. As being discussed above, because thermal characteristics and long-term reliability of a plastic fiber coupler that involves the use of glue depend upon the quality of glue and workmanship of the connection, plastic fiber coupler 500 which does not use any glue is generally considered as having a relatively high reliability.

Diameter of the supporting rod in plastic fiber couplers manufactured in accordance with embodiment of the present invention may be determined as follows. In Table 1 below, it is assumed that standard plastic optical fibers are used for forming plastic optical couplers which have a core diameter around 0.98 mm (after the cladding layer is removed). With the single-ring shape of fiber bundle, diameters of the supporting rod may be determined according to the below Table 1 for different number of ports of the fiber coupler:

TABLE 1

Diameter of supporting rod used in a plastic fiber coupler.

| Number of Ports (N) | 8 | 16 | 32 | 40 | 48 |
|---|---|---|---|---|---|
| Diameter of supporting rod (mm) | 1.58 | 4.04 | 9.01 | 11.50 | 14.00 |

FIG. 6(a) and FIG. 6(b) are demonstrative illustrations of a reflective type plastic fiber coupler made of a single ring bundle of sixteen (16) plastic optical fibers and a mixing tube according to another embodiment of the present invention. Plastic fiber coupler 600 may be fabricated in a similar or substantially same procedure and/or process as that of the 8-port plastic fiber coupler 500. As is shown in FIG. 6(a) and FIG. 6(b), plastic fiber coupler 600 includes a fiber bundle 601; a short transitional region 603 that transforms and/or converts fiber bundle 601 into a mixing tube 602; a supporting rod 611; and a cross-section S4 coated with a reflective film or being attached to a mirror. According to the Table 1 above, supporting rod 611 may have a diameter of approximately 4.04 mm when standard plastic optical fibers of 1.00 mm diameter are used in fiber bundle 601 as the input/output fibers.

FIG. 7 is a demonstrative illustration of cross-section of N plastic optical fibers being arranged in a single-ring shape according to one embodiment of the present invention. Generally, N can be any integral number larger than six (6), and the supporting rod 711 may be selected to have a diameter that can support a uniform formation of a single ring of fibers around thereof. In theory, regardless the number of ports (N), when fiber bundle 701 is attached to a mixing tube, so long as the mixing tube, or the region where optical signal expands, has a sufficient length, it is always possible to obtain a substantially uniform and evenly distributed optical light at the cross-sectional area of fiber bundle 701 when the optical light is reflected back from the mixing tube or, in the case of a transmissive type plastic fiber coupler, at the other end of the mixing tube. A demonstrative transmissive type plastic fiber coupler will be described in more details later with reference to FIG. 11.

With the number of ports of a plastic fiber coupler increases, size of the supporting rod also increases. The same is true for the required length of the mixing tube in order to achieve uniform distribution of light being coupled back into the input/output fibers. In situations where the length of mixing tube is restricted by certain conditions and/or is not preferable to have a length over a certain limit, in one embodiment, the plastic optical fiber bundle may be arranged in more than one-ring, such as a double-ring or multiple-ring shape, to result in a length of mixing tube that is shorter than otherwise would be required in a single-ring shape.

FIG. 8 is a demonstrative illustration of cross-section of thirty-two (32) plastic optical fibers being arranged in a double-ring shape according to one embodiment of the present invention. In this particular embodiment, a first group of sixteen (16) POFs may be arranged in a first ring 821 next to and surrounding a supporting rod 811, and a second group of another sixteen (16) POFs may be arranged in a second ring 822 next to and surrounding the first ring and as well as the supporting rod 811. According to one embodiment, a mixing tube (not shown) similar to those described above may be connected or glued to the double-ring fiber bundle 801. In a double-ring situation, it is to be noted that a thickness of sidewall of the mixing tube may be between one and two times the diameter of the plastic optical fibers. More precisely, thickness of sidewall of the mixing tube may be around 1.87 times the diameter of the plastic optical fiber as may be calculated by the simple geometry shown in FIG. 8.

According to embodiment of the present invention, an optical fiber coupler having a double-ring fiber bundle structure may need a significantly less length of a mixing tube as well as a much smaller supporting rod, compared with otherwise a single-ring fiber bundle structure. But these advantages may be at the expense of having slightly worse uniformity in terms of optical coupling, and/or insertion loss than that of a single ring fiber bundle structure.

FIG. 9 is a demonstrative illustration of cross-section of 2×N plastic optical fibers being arranged in a double-ring shape according to another embodiment of the present invention. More specifically, fiber bundle 901 may have a first ring 921 and a second ring 922, and the second ring 922 of N-POFs may surround the first ring 921 of N-POFs which in turn surrounds a supporting rod 911. Generally, the number N may be any integral number larger than six (6). In the situation where extremely high number of ports is needed, additional layer or layers of fiber rings may be used at the sacrifice of uniformity in optical light distribution.

FIG. 10 is a demonstrative illustration of small groups of fibers being used in forming a plastic fiber coupler according to yet another embodiment of the present invention. In situations where large number of input/output fibers are needed, instead of forming multiple rings of fibers surrounding a supporting rod as being described above with references to FIG. 8 and FIG. 9, several fibers may first be grouped together to form a single fiber. The newly formed single fibers may then be arranged to form the fiber ring surrounding the supporting rod as being described above with references to FIGS. 3-7. For example, in the case that twenty-four (24) fibers are used, the twenty-four fibers may be divided into six (6) groups and each group contains four (4) fibers. As shown in FIG. 10, the four fibers 1012, 1013, 1014, and 1015 may be partially melted through a heating process to be re-shaped into a single transitional fiber 1011. Cross-sectional area of transitional fiber 1011 generally is the same as the sum of fibers 1012, 1013, 1014 and 1015. In other words, diameter of transitional fiber 1011 is about twice (square-root of 4) the diameter of each original fiber 1012, 1013, 1014, or 1015. The six transitional fibers (from the six groups of original fibers) are subsequently used to form a single fiber ring bundle 1001, which then forms a star coupler such as the one shown in FIG. 3.

Alternatively, the twenty-four original fibers may be divided into eight (8) groups and each group contains three (3) fibers. The three fibers, as shown in FIG. 10 as fibers 1022, 1023, and 1024, may be partially melted and/or softened through a carefully controlled heating process and re-shaped into a single transitional fiber 1021. Cross-sectional area of transitional fiber 1021 may be kept the same as the sum of fibers 1022, 1023, and 1024, to have a diameter that is about 1.732 (square-root of 3) times the diameter of each original fiber 1022, 1023, or 1024. The eight transitional fibers are subsequently used to form a single ring of fiber bundle, which then forms a star coupler such as those shown FIG. 4 and FIG. 5.

From the description above, a person skilled in the art will appreciate that embodiment of the present invention is not limited in the above respects. For example, large number of fibers may be first divided into groups of fibers with each group having, for example, two, three, four, or even higher number of fibers. Each group of fibers may be re-shaped into a single transitional fiber and such transitional fibers may then be used to form various plastic fiber couplers as being described above.

FIG. 11 is a demonstrative illustration of an eight-by-eight (8×8) transmissive type plastic fiber coupler according to another embodiment of the present invention. In the present embodiment, a first group of plastic optical fibers or fiber bundle 1101 may be attached, or converted through a first short transitional region 1103, to a region of optical mixing tube 1102. At the other end, the region of optical mixing tube 1102 may be attached or converted back through a second short transitional region 1104, to a second group of plastic optical fibers or fiber bundle 1105. An optical light coming from any one or more of the first group of plastic optical fibers 1101 may be launched into mixing tube 1102, wherein the optical light becomes uniformly distributed across the cross-section of mixing tube 1102, and gets coupled into each and every plastic optical fibers of the second fiber bundle 1105 at substantially uniform and/or even intensity. Different from a reflective type plastic fiber coupler, since optical lights propagates through mixing tube 1102 only once, either from left to right or from right to left depending upon the specific application, the required length of mixing tube 1102 is generally twice as long as those used in a reflective type plastic fiber coupler. For example, the length of mixing tube 1102 may be between about 10 cm to about 40 cm since optical light travels only once inside the mixing tube 1102.

In FIG. 11, mixing tube 1102 is illustrated to be formed from part of the first fiber bundle 1101 and second fiber bundle 1105. A person skilled in the art will appreciate that embodiment of the present invention may not be limited in this respect. For example, plastic fiber coupler 1100 may be formed by attaching a mixing tube (e.g., 1102), through the use of glue, to a first fiber bundle (e.g., 1101) at a first end and to a second fiber bundle (e.g., 1105) at a second end. Further for example, plastic fiber coupler 1100 may be formed by attaching two reflective type plastic fiber couplers together at their respective cross-sectional areas of the mixing tubes. In this case, it is understood that no reflective coating or film shall be applied to the jointed cross-sectional areas of the two mixing tubes.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A fiber coupler comprising:
   a bundle of plastic optical fibers (POFs) arranged in a ring-shape; and
   an optical mixing tube attached to a cross-section of said bundle of POFs.

2. The fiber coupler of claim 1, wherein said bundle of POFs comprises a single layer of said POFs forming a single ring-shape and wherein thickness of a sidewall of said optical mixing tube is substantially same as a diameter of said POFs.

3. The fiber coupler of claim 2, wherein said optical mixing tube has first and second cross-sections of said sidewall, said first cross-section being glued to said cross-section of said bundle of POFs, and said second cross-section being coated with a reflective film or being attached to a reflective mirror.

4. The fiber coupler of claim 3, wherein said optical mixing tube has a length ranging from about 5 cm to about 20 cm.

5. The fiber coupler of claim 1, wherein said bundle of POFs comprises a supporting rod providing support for forming said ring-shape bundle of POFs in a center thereof.

6. The fiber coupler of claim 5, wherein a diameter of said supporting rod is determined by the number of said POFs surrounding said supporting rod, such that said POFs forms a tightly arranged single ring in contact with each other and with said supporting rod.

7. The fiber coupler of claim 1, wherein said bundle of POFs comprises two layers of said POFs forming a double ring-shape, and wherein thickness of a sidewall of said optical mixing tube is larger than a diameter of said POFs but smaller than two times said diameter.

8. The fiber coupler of claim 1, wherein said bundle of POFs is a bundle of input POFs, further comprising a bundle of output POFs arranged in a ring-shape, wherein said optical mixing tube is attached to said bundle of input POFs at a first cross-section and attached to said bundle of output POFs at a second cross-section.

9. The fiber coupler of claim 8, wherein said optical mixing tube have a length between said first and said second cross-sections ranging from about 10 cm to about 40 cm.

10. A fiber coupler comprising:
    a bundle of input plastic optical fibers (POFs) arranged in a single ring-shape;
    a bundle of output POFs arranged in a single ring-shape; and
    an optical mixing tube connecting a cross-section of said bundle of input POFs to a cross-section of said bundle of output POFs.

11. The fiber coupler of claim 10, wherein said optical mixing tube has a length ranging from about 10 cm to about 40 cm.

12. The fiber coupler of claim 10, wherein said optical mixing tube is made of a same material as that of said POFs or a substantially pure silica tube.

13. The fiber coupler of claim 10, wherein inner and outer surfaces of a sidewall of said optical mixing tube are coated with a layer of polymer material, said layer of polymer having substantially same optical properties as that of a cladding layer of said POFs.

14. A fiber coupler comprising:
a bundle of plastic optical fibers (POFs) arranged in a ring-shape;
a supporting rod surrounded by said bundle of POFs; and
an optical mixing tube transformed from a portion of said bundle of POFs.

15. The fiber coupler of claim 14, wherein said ring-shape bundle of POFs transforms gradually into said optical mixing tube through a short transitional region.

16. The fiber coupler of claim 14, wherein claddings of said portion of said bundle of POFs are removed before a heating process is applied to deform said bundle of POFs into said optical mixing tube.

17. The fiber coupler of claim 14, wherein thickness of a sidewall of said optical mixing tube is about same or slightly less than a diameter of said POFs after claddings of said POFs are removed.

18. The fiber coupler of claim 14, wherein said optical mixing tube has a length between about 5 cm and about 20 cm, and a cross-section at an end of said optical mixing tube is coated with a reflective film or being attached to a reflective mirror.

19. The fiber coupler of claim 14, wherein said supporting rod is made of a plastic optical fiber having a diameter larger than a diameter of said POFs and having a cladding made of substantially same material as claddings of said POFs.

20. The fiber coupler of claim 14, wherein each said POF is made of a group of other plastic fibers containing two, three, or four said other plastic fibers that are partially melted together.

* * * * *